(12) United States Patent
Simic-Glavaski et al.

(10) Patent No.: US 6,528,768 B1
(45) Date of Patent: Mar. 4, 2003

(54) ELECTRON SOURCE FOR FOOD TREATING APPARATUS AND METHOD

(75) Inventors: Branimir Simic-Glavaski, 2481 Edgehill Rd., Cleveland, OH (US) 44106; Michael G. Simic, 9404 Bac Pl., Gaithersburg, MD (US) 20877

(73) Assignees: Branimir Simic-Glavaski, Cleveland, OH (US); Michael G. Simic, Gaitersburg, MD (US)

( * ) Notice: Subject to any disclaimer, the term of this patent is extended or adjusted under 35 U.S.C. 154(b) by 0 days.

(21) Appl. No.: 10/014,631

(22) Filed: Oct. 26, 2001

(51) Int. Cl.⁷ .............................. A23L 1/25; A23L 3/32; H05B 3/03
(52) U.S. Cl. ................. 219/438; 219/386; 219/441; 426/237; 426/244
(58) Field of Search ................................. 219/385, 386, 219/438, 441; 426/237, 244, 523; 392/311, 313; 99/358

(56) References Cited

U.S. PATENT DOCUMENTS

| 5,356,646 A | 10/1994 | Simic-Glavaski et al. .. 426/237 |
| 5,718,934 A | 2/1998 | Hayakawa ................... 426/237 |

*Primary Examiner*—Joseph Pelham
(74) *Attorney, Agent, or Firm*—Renner, Otto, Boisselle & Sklar, LLP

(57) ABSTRACT

A food treating apparatus and method wherein an electric current is provided by an electric circuit, the food treating apparatus including a vessel and a handle, and wherein at least part of the electric circuit is integral with the handle and is operative to provide electrons to food in the vessel.

20 Claims, 6 Drawing Sheets

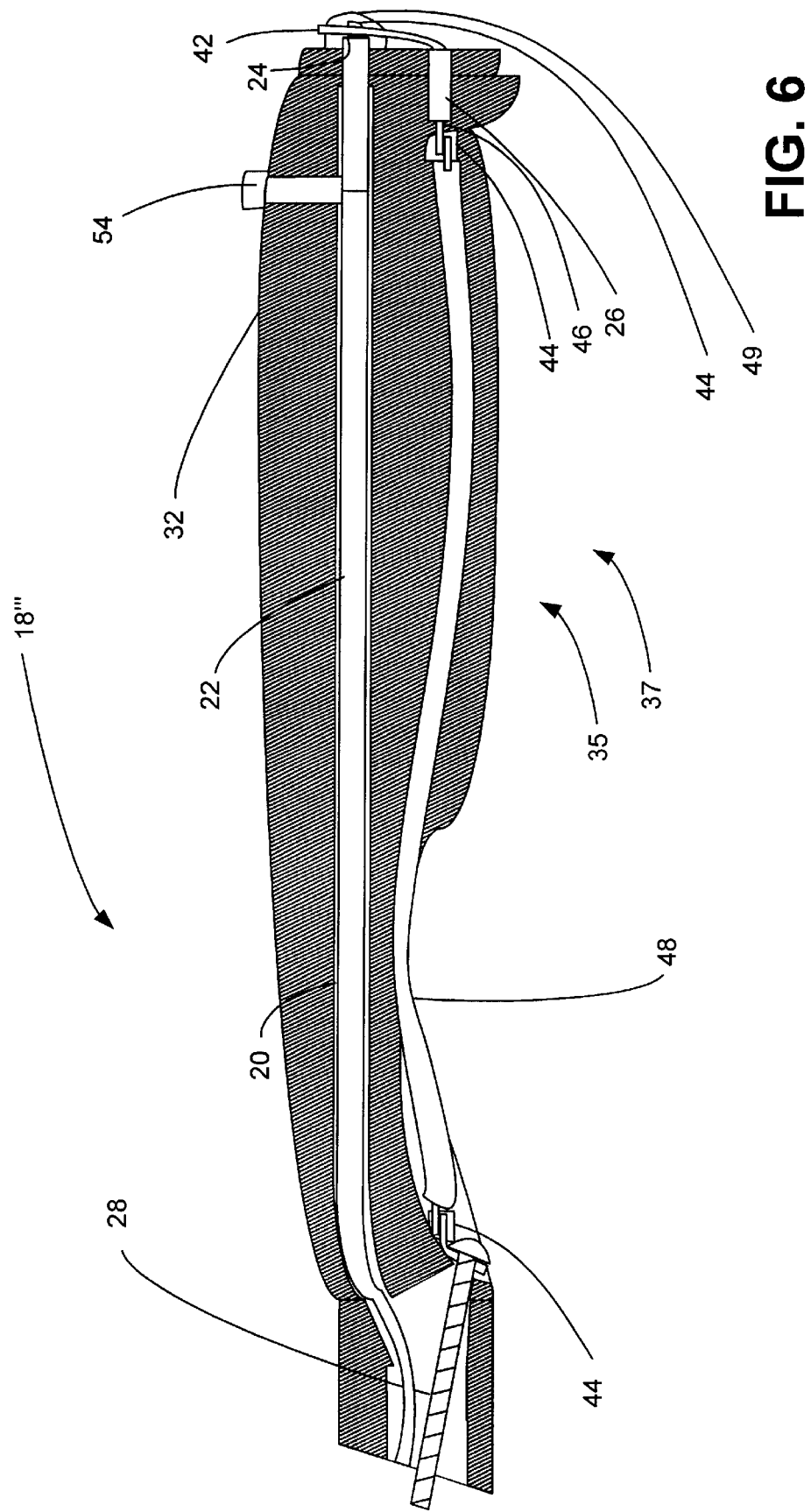

US 6,528,768 B1

ELECTRON SOURCE FOR FOOD TREATING APPARATUS AND METHOD

FIELD OF THE INVENTION

The present invention relates generally to electron sources and specifically to electron sources for food treating apparatus and method for treating food.

BACKGROUND OF THE INVENTION

U.S. Pat. No. 5,356,646 to Simic-Glavaski (hereinafter Simic-Glavaski), which is hereby incorporated by reference in its entirety, discloses that the ingestion of externally generated oxidative products such as food cooked by a thermal process may be carcinogenic. When food is cooked by a thermal process it may tend to have a carcinogenic effect due to the depletion of electrons in the food. It is believed that the food is depleted of electrons during a cooking process due to thermal excitation and oxidation. Simic-Glavaski discloses by adding electrons to food that is in a cooking vessel or in contact with a grill carcinogenic effect can be reduced. Simic-Glavaski discloses a cooking apparatus and a method of supplying electrons to food that is contained in the vessel or that is in contact with the grill.

In an embodiment disclosed by Simic-Glavaski, respective electrodes are placed in a cooking medium, such as oil, water or the like, and electric potential and electric current are provided thereby to food. It would be desirable to integrate the electron source into a food treating apparatus, such as a cooking apparatus such as a pot, a grill or the like. In the embodiment of disclosed by Simic-Glavaski, the electrons are provided from a relatively localized source. It would be advantageous to increase the area over which the electrons are provided in the food treating apparatus. By increasing the area over which the electrons are supplied, more electrons are provided over a larger portion of the food product.

Therefore, there is a strong need in the art to improve the distribution of electrons into a food product in a food cooking, cooling, storing, or the like apparatus and process. There also is a need to enhance the countering of the carcinogenic effect that occurs during a food treating process, such as, for example, cooking, cooling, storing, serving, etc.

As used herein the term "food treating" is broadly understood to mean cooking, cooling, storing, serving, or the like, as are further described below.

SUMMARY OF THE INVENTION

An aspect of the invention relates to a food treating apparatus wherein an electric current is provided by an electric circuit, the food treating apparatus including a vessel and a handle, and wherein at least part of the electric circuit is integral with the handle and is operative to provide electrons to food in the vessel.

Another aspect of the invention relates to a food treating apparatus having a handle and a vessel for food, comprising a circuit for providing electrons for distribution via the vessel to food, the circuit including an anode, a resistive element and a connection to the vessel, and wherein at least part of the anode is in the handle.

Another aspect of the invention relates to a method of providing electrons for absorption by an oxidizing medium including the step of providing an electric current by an electric circuit wherein at least part of the electric circuit is integral with a handle and is operative to provide electrons to food in a vessel.

BRIEF DESCRIPTION OF THE DRAWINGS

FIG. 6 is a schematic cross-sectional view of yet another embodiment of a handle for a food treating apparatus.

DETAILED DESCRIPTION

Figure 1:
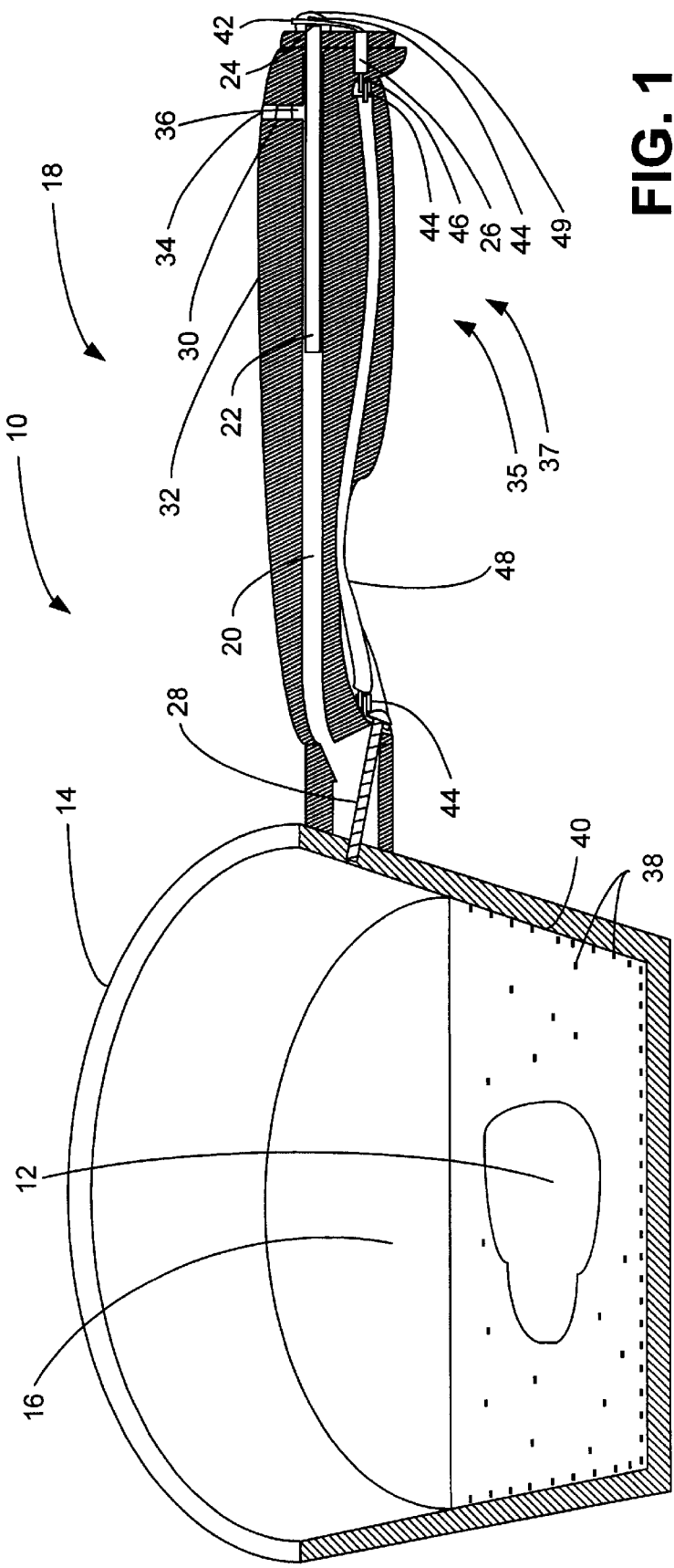
FIG. 1 is a schematic cross-sectional view of a food treating apparatus in accordance with an embodiment of the present invention.
Figure 2:
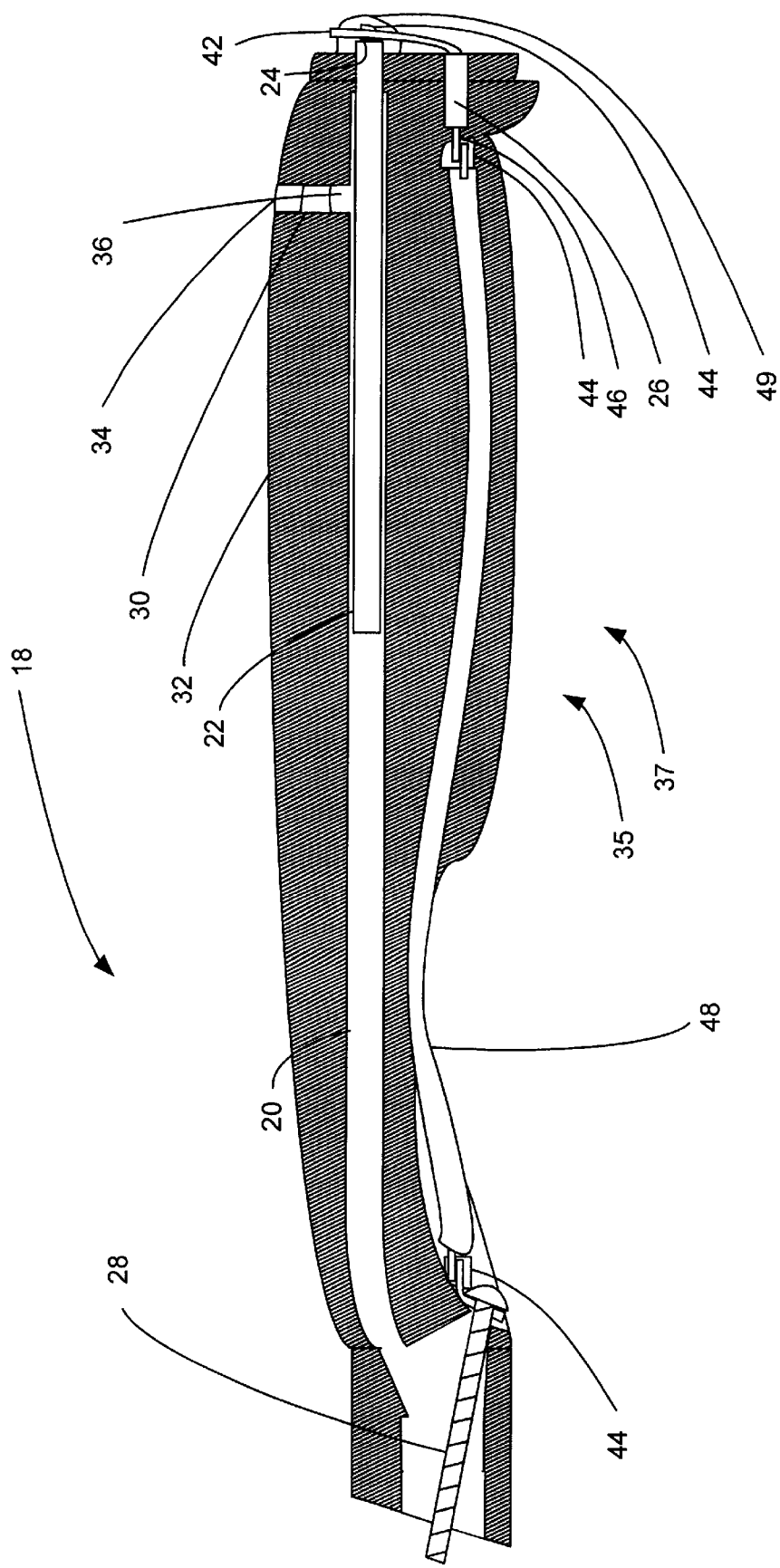
FIG. 2 is an enlarged schematic cross-sectional view of the handle of the food-treating apparatus of FIG. 1.

With reference to FIGS. 1 and 2, a food treating apparatus 10 for providing electrons for absorption by a food material 12 is shown. The food treating apparatus 10 includes a vessel 14 having sufficient volume to contain the food material 12. The vessel 14 may be a storage container, cooling container, preparing container, warming container, serving dish or any of a variety of cooking vessels; non-limiting examples include a pot, pan, cookware, grill, skillet, kettle, dish, bowl, wok, appliance or the like and associated utensils. Non-limiting examples of utensils may include a probe, a skewer, a spit or the like. The vessel 14 may be made of any conductive material, e.g., metal, stainless-steel, iron, copper, aluminum, aluminum alloy or the like. The vessel 14 may act as a cathode. The vessel 14 may be coated with a nonstick conductive coating to prevent the food medium 12 from sticking to a surface. The food material 12 may be placed in the vessel 14 in a quantity of a medium 16. The medium 16 may be an oxidizing medium, e.g., water, sauce, oil, fat, or other medium used in a boiling, cooling, warming, steaming, basting, skewering, sauteing, baking, roasting, frying or deep frying process or other cooking, storing, cooling, preparing or treating process.

A handle 18 may be permanently or temporarily attached to the vessel 14. The handle 18 includes a passage 20 running through at least a part of the handle 18. An anode 22 may be contained partly within the passage 20. An end 24 of the anode 22 is electrically coupled with a resistive element 26. The resistive element 26 is electrically coupled with the vessel 14 by a conductive fastener 28. The anode 22 may be made of a conductive material such as, for example, metals like copper, zinc, aluminum or some other conductive material or possibly a semiconductive material. The passage 20 includes a passage opening 30 at the surface 32 of the handle 18. The passage opening 30 may be closed with a removable plug 34. The conductive fastener 28 may be, for example, a flat head screw, clamp, rivet, conductive weld or the like.

A circuit 35 is formed. The circuit 35 includes the anode 22 electrically coupled with the resistive element 26, which in turn is electrically coupled with the vessel 14. The vessel 14 acts as a cathode in the circuit 35. When the electrolyte 36 is introduced into the passage 20 containing the anode 22, a primary electrochemical battery 37 is formed due to the potential differential between the anode 22 and the cathode, i.e., vessel 14. The anode 22 may be formed of a conductive material with a higher electrical potential than the electrical potential of the vessel 14 so the vessel becomes the cathode of the circuit 35 and battery 37. The resistive element 26 may be a resistor or some other impedance that cooperates with the anode 22 and vessel 14 (cathode) to provide current flow. Thus, the vessel 14 (cathode) in circuit 35 is supplied with electrons for delivery directly into the cooking medium 16 and to the food medium 12. Although circuit 35 is shown to include the anode 22, the resistive element 26 and the vessel 14 (cathode), it is understood that the circuit could include other elements, for example, switches, other resistors, a capacitor, an inductor or the like.

The electrochemical battery 37 produces a current wherein electrons 38 flow to a surface 40 of the vessel 14. The electrons 38 may be absorbed by the food material 12 where the food material 12 comes in contact with the surface 40. Excess electrons 38 flowing from anode 22 to the vessel 14 are absorbed by the food material 12 to replace electrons lost by the thermally-induced oxidation of the cooking process, and may result in the food material 12 being electron enriched at the end of the cooking process or at least in effect less electron depleted than would otherwise be the case. Although the absorption of electrons by the food material 12 is described in relationship to a cooking process, it would be understood by those skilled in the art that the invention may be used during cooling, storing, preparing or other food treating processes. Alternatively or additionally, the electrons and/or negative ions (sometimes collectively referred to herein as "electrons") 38 may flow from the cathode, i.e., the vessel 14 all through the medium 16 to the food material 12 to be absorbed by the food material.

FIG. 2 is an enlarged drawing of the handle 18 illustrating several wires and connections in the circuit 35 leading to the vessel 14 (not shown). A wire 42 from an end of the resistive element 26 is electrically coupled with the end 24 of the anode 22 by an electrical connection 44, e.g., solder, conductive adhesive, threaded connection or by some other means as is known by those who have ordinary skill in the art. Another electrical connection 44 electrically couples a wire 46 from another end of the resistive element 26 with a first end of a wire 48. A second end of the wire 48 is electrically coupled by yet another electrical connection 44 with the conductive fastener 28. The wires 42, 46 and 48 may be made of a conductive material, e.g., aluminum, copper, or the like. Further, the wire 48 may be insulated by an insulating material which encases the conductive material. Additionally, the wire 48 may be partially contained within the handle and isolated from the passage 20 containing the anode 22.

The handle 18 may be made of any material that is suitably used for cookware, etc. For example, the handle may be of an insulative material, electrically nonconductive material, thermally insulative material, thermally nonconductive material, plastic, phenolic, glass, ceramic, wood or some other material that has suitable strength and rigidity characteristics for the desired purpose or desired use with cookware, food storage containers, etc., as are mentioned elsewhere herein. The handle may be electrically conductive, e.g. metal, with suitable electrical insulation provided.

The handle 18 may be formed of a substantially solid material that is drilled out to provided the passage 20 for the anode 22. Additionally, the handle 18 may be drilled out to provide the passage opening 30 for delivering the electrolyte 36 into the passage 20 for contact with the anode 22. If desired, the handle 18 may be molded in such a way as to provide the passage 20 for the anode 22 and also the passage opening 30 for the electrolyte 36, as described. Additionally, the handle 18 may be drilled to provide space for the various wires and connections illustrated or may be molded to provide the various passages for the wires and/or connections. Moreover, the handle 18 may be molded directly to the respective anode 22 and wires, as well as the various connections provided, for example, as is illustrated in FIG. 2. Such direct molding enhances the integrity of the handle and may provide for protection of the various connections between the wires, etc. To provide adequate space in the passage 20 for both the anode and electrolyte, standoffs or the like may be used to locate the anode in the passage 20 as the passage itself is defined during the molding process. These are just examples of various ways in which the handle 18 may be made and of materials of which the handle may be made. However, it will be appreciated by those having ordinary skill in the art that the handle 18 may be made of other materials and/or using other processes or methods.

Figure 3:
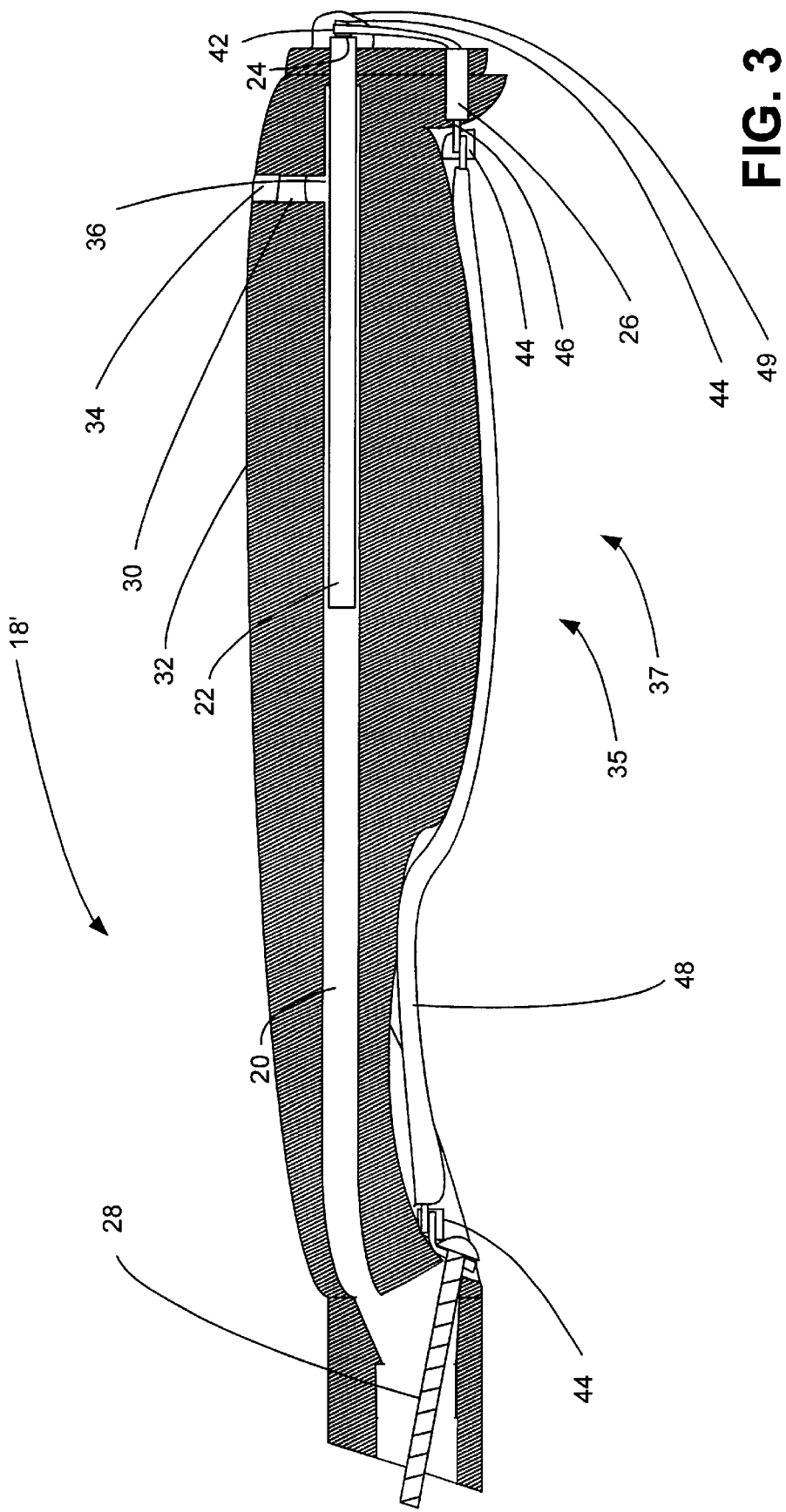
FIG. 3 is a schematic cross-sectional view of another embodiment of a handle for a food treating apparatus.

FIG. 3 illustrates an alternative embodiment of a handle 18' of an electron generating cooking apparatus such as described above. In this embodiment, the wire 48 is mounted on an outside surface of the handle 18'. An advantage of this embodiment is the reduction of the number of manufacturing steps required to manufacture of the handle 18'. Another advantage of this embodiment is the accessability of the wire 48 and electrical connections 44 should a repair or replacement be required.

Figure 4:
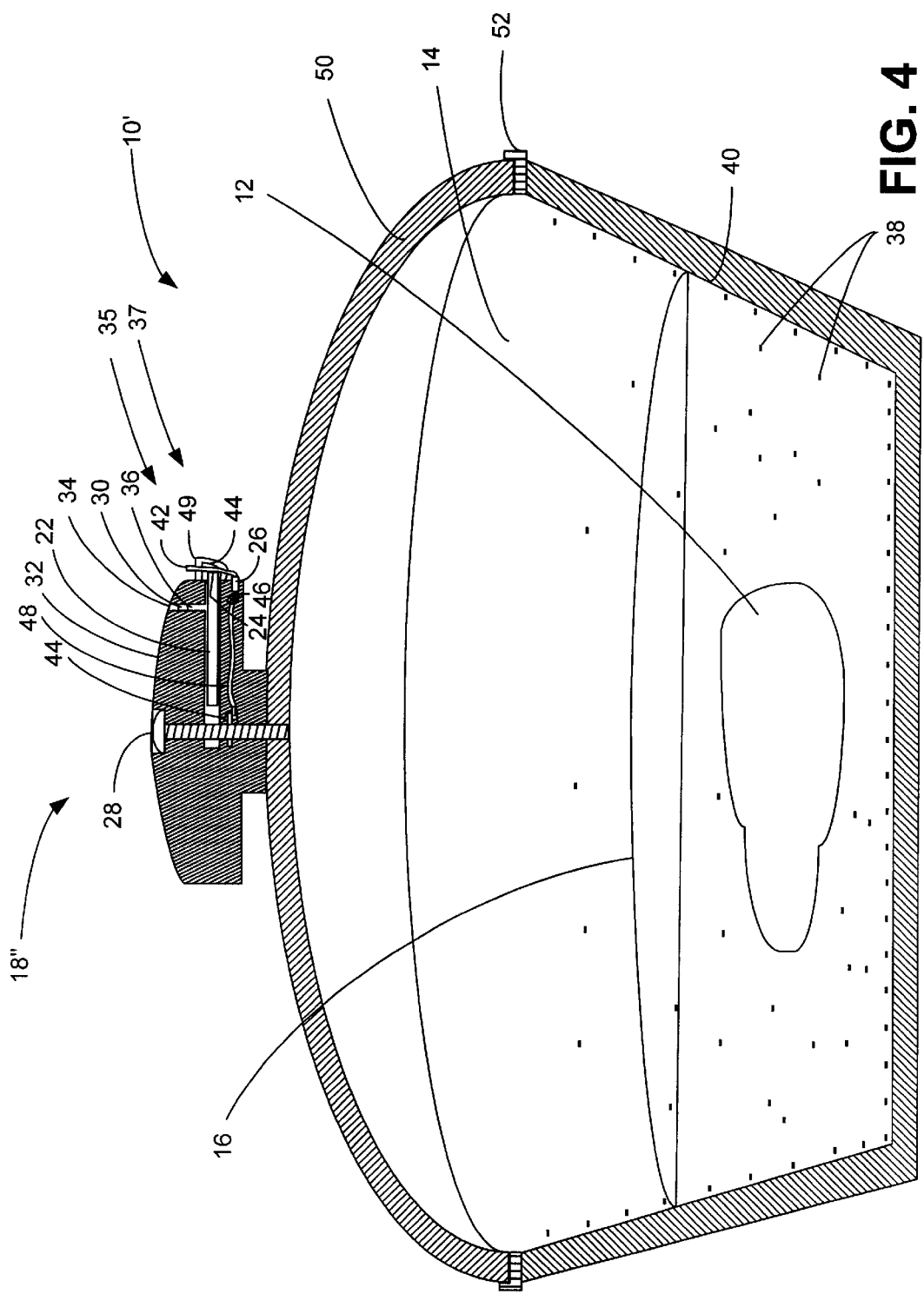
FIG. 4 is a schematic cross-sectional view of another embodiment of a food treating apparatus with a handle on the apparatus lid.
Figure 5:
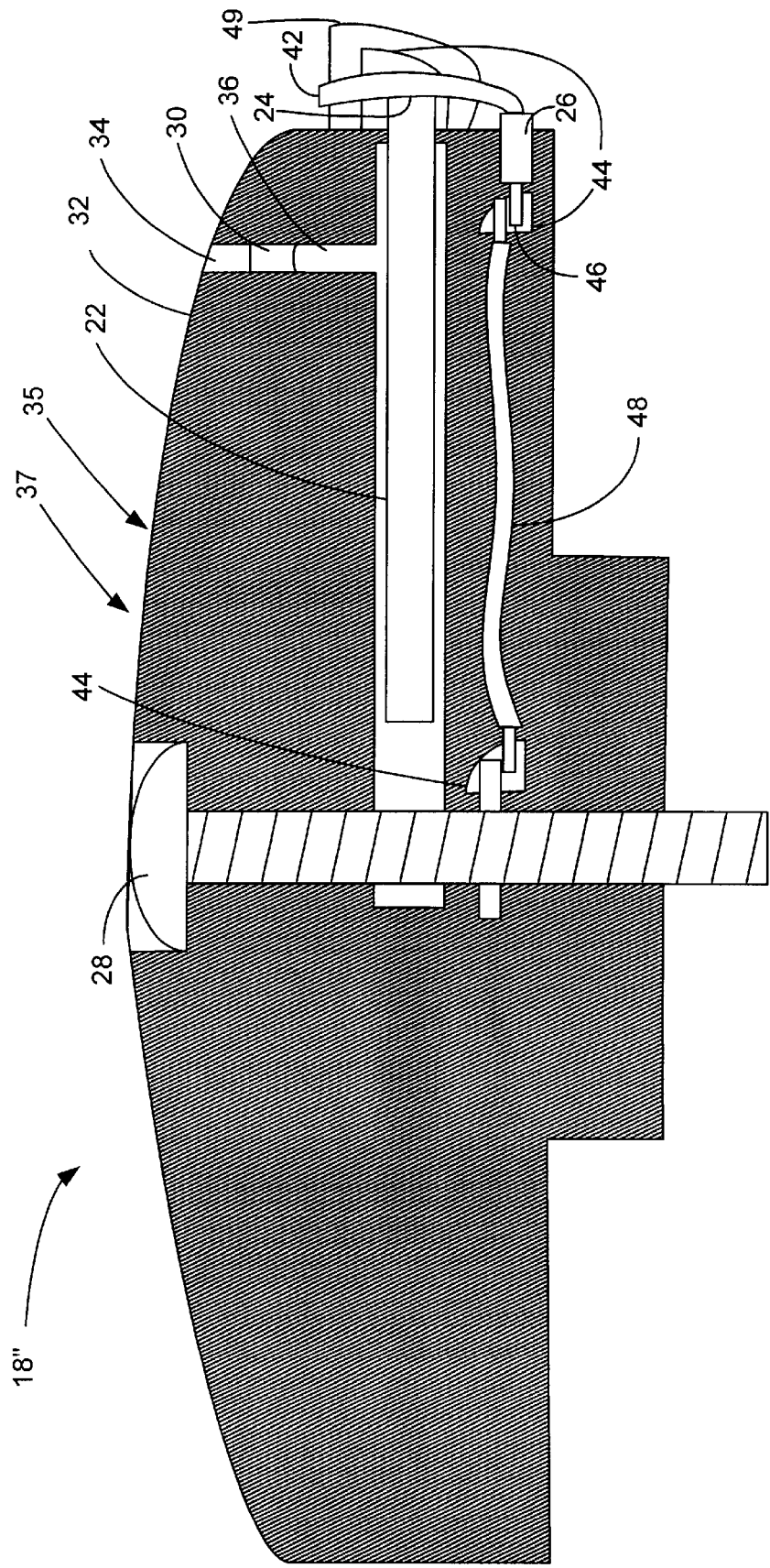
FIG. 5 is an enlarged schematic cross-sectional view of the handle of the food treating apparatus of FIG. 4.

FIGS. 4 and 5 illustrate another embodiment of food treating apparatus 10' of the invention wherein electrons are provided to the vessel 14 via an electron source provided in a lid 50, a cover or the like. The circuit 35 is formed by the anode 22 electrically coupled with the resistive element 26 which in turn is electrically coupled with the vessel 14 acting as a cathode as described above. In this embodiment, the resistive element 26 is electrically coupled with a conductive fastener 28 which may be permanently or temporary attached to the lid 50. The lid 50 provides a path for the electrons to reach the vessel 14 when placed on a rim 52 which is formed on the vessel 14. The lid 50 and the rim 52 may be made of the same electrically conductive material as the vessel 14 or another suitable material which allows the electrons to flow to the vessel 14. FIG. 5 illustrates a more detailed drawing of the handle 18".

FIG. 6 illustrates an alternate embodiment of a handle 18"' for an electron producing food treating apparatus 10, for example. In this embodiment, a current source to the anode 22 and vessel 14 is provided by a solar cell 54 mounted integrally upon the handle 18"'. The term "solar cell" is understood to mean any device that provides an electrical output in response to one or more of visible light, UV, IR or the like. In this embodiment, solar cell 54 can produce a current of, for example, five microamps to 500 nanoamps sufficient to provide an adequate source of electrons to flow which can be absorbed by the food being cooked to maintain or supplement electron content of the food material 12. An advantage of this embodiment is the availability of ambient energy to replace or to supplement a battery or other source. Alternatively, the solar cell 54 may be integrally formed in the handle 18"' such that the upper surface of the solar cell 54 is flush with the surface 32 of the handle 18"'.

While the invention has been described in conjunction with exemplary embodiments herein, it is evident that many equivalents, alternatives, modifications and variations will be apparent to those skilled in the art in light of the foregoing description. Accordingly it is intended to embrace all such equivalents, alternatives, modifications and variations within the spirit and scope of the appended claims.

We claim:

1. A food treating apparatus wherein an electric current is provided by an electric circuit, the food treating apparatus including a vessel and a handle, and wherein at least part of the electric circuit is integral with the handle and is operative to provide electrons to food in the vessel.

2. The food treating apparatus according to claim 1, wherein the electric circuit includes:
   an anode;
   a cathode; and
   a resistive element and wherein the cathode and anode are cooperative to provide electrons by an electrochemical process.

3. The food treating apparatus according to claim 1, wherein the vessel is a cathode in the electric circuit.

4. The food treating apparatus according to claim 1, wherein the handle includes an anode at least partly within a cavity within the handle.

5. The food treating apparatus according to claim 4, wherein an electrochemical potential of the vessel is lower than an electrochemical potential of the anode.

6. The food treating apparatus according to claim 4, wherein the cavity contains an electrolyte to activate the electric circuit.

7. The food treating apparatus of claim 6, wherein in the handle has an opening inlet to the cavity to provide the electrolyte into the cavity.

8. The food treating apparatus according to claim 1, wherein the handle is selectively attachable to and removable from the food treating apparatus.

9. The food treating apparatus according to claim 1, wherein the vessel is able to withstand temperatures for cooking food.

10. The food treating apparatus according to claim 1, wherein the electric current is provided by a solar cell.

11. The food treating apparatus according to claim 1, wherein the vessel includes a lid and the handle is associated with the lid.

12. The food treating apparatus according to claim 1, further comprising an electrolyte.

13. A handle for a food treating apparatus, comprising a handle body attachable to a food treating apparatus, a chamber in the handle body, an anode at least partly contained in the chamber, and a connection from the anode to a cathode to provide electrons for food during a food treating process.

14. The handle according claim 13, further comprising an electrolyte in the chamber.

15. The handle according claim 14, wherein an inlet to the chamber is provided for applying an electrolyte in the chamber.

16. A food treating apparatus having a handle and a vessel for food, comprising an electric circuit for providing electrons for distribution via the vessel to food, the circuit including an anode, a resistive element and a connection to the vessel, and wherein at least part of the anode is in the handle.

17. The food treating apparatus according to claim 16, wherein the vessel is a cathode in the electric circuit.

18. The food treating apparatus according to claim 16, wherein a surface of the vessel distributes electrons to food in the vessel.

19. A method of providing electrons for absorption by an oxidizing medium including the step of:
    providing an electric current by an electric circuit wherein at least part of the electric circuit is integral with a handle and is operative to provide electrons to food in a vessel.

20. The method according to claim 19, wherein the method further includes the step of activating the electric circuit by providing an electrolyte to an anode of the electric circuit.

* * * * *